Patented July 8, 1924.

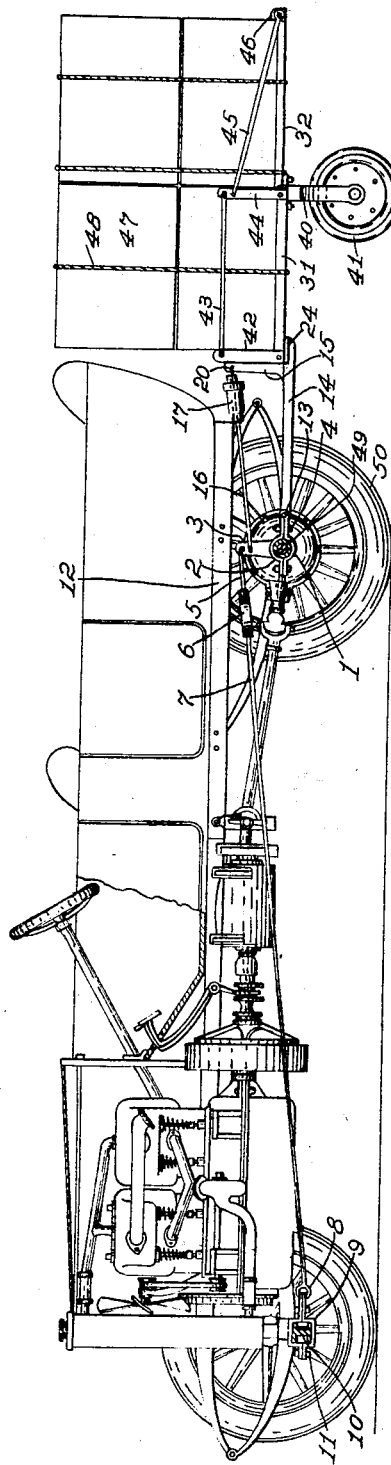

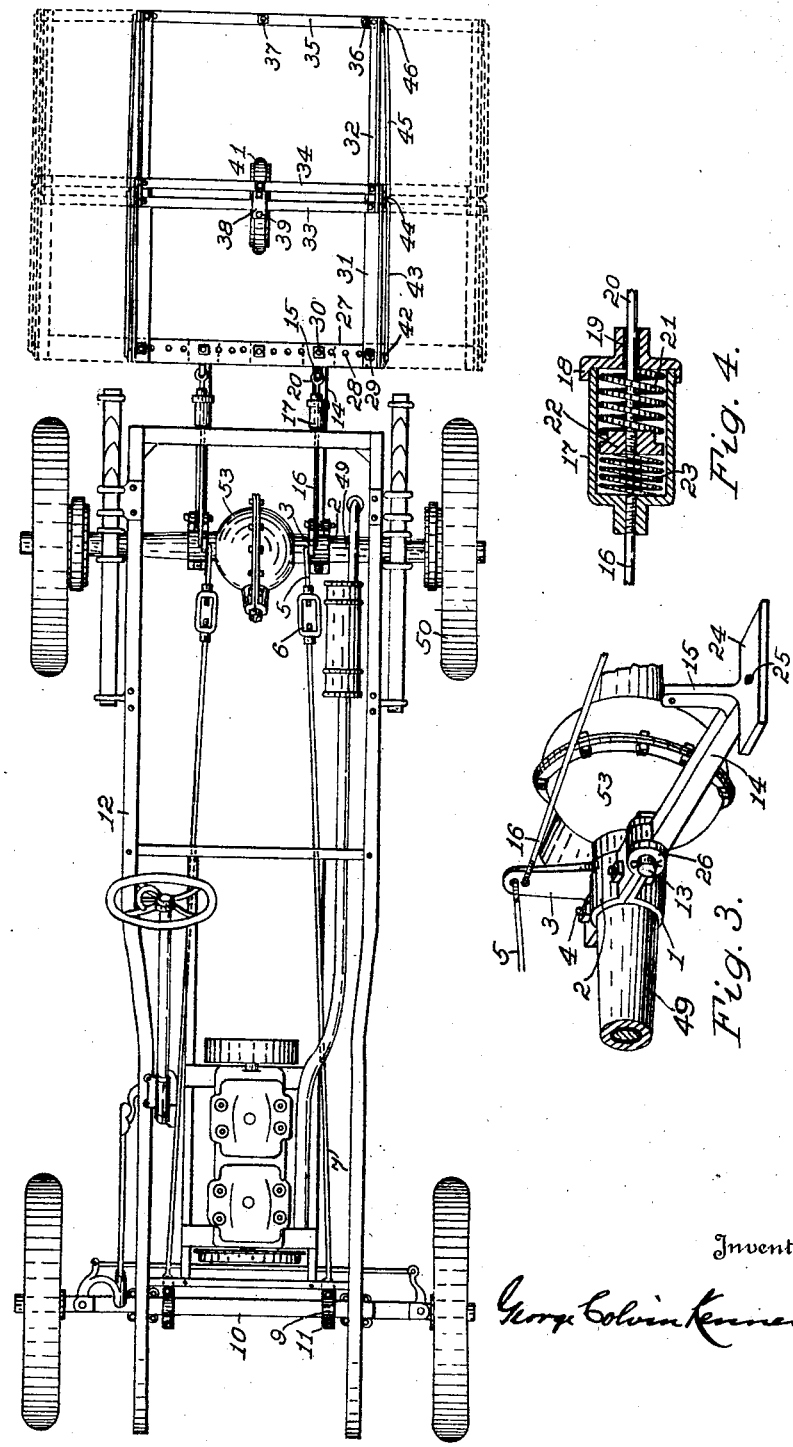

1,500,395

UNITED STATES PATENT OFFICE.

GEORGE COLVIN KENNEDY, OF WATERLOO, IOWA.

AUXILIARY FREIGHT CARRIER FOR VEHICLES.

Application filed December 7, 1922. Serial No. 605,429.

*To all whom it may concern:*

Be it known that I, GEORGE COLVIN KENNEDY, a citizen of the United States of America, and a resident of Waterloo, Black Hawk County, Iowa, have invented certain new and useful Improvements in Auxiliary Freight Carriers for Vehicles, of which the following is a specification.

My invention relates to improvements in auxiliary freight carriers for vehicles, and an object of my improvements is to supply means for securely anchoring such carriers upon the rear axles of vehicles to project rearwardly therefrom, the anchoring means acting to prevent the carriers and their loads from exercising torsion upon said axle or undue shocks to the vehicle.

Another object is to provide an auxiliary carrier for a vehicle positioned to the rear thereof and having its elements adapted and arranged for relative adjustments either transversely, longitudinally, or in both said directions.

Another object is to furnish for occasional use in assisting to carry heavy or very bulky or elongated loads on the carrier, auxiliary removable means of transportation for the carrier.

These objects have been accomplished by the means which are hereinafter described and claimed, and which are illustrated in the accompanying drawings, in which Fig. 1 is a view, partly in side elevation and partly broken away, of a motor-vehicle fully equipped with my auxiliary freight carrier. Fig. 2 is a top plan of said vehicle with the body removed with other parts, the carrier being mounted thereon, and with dotted lines showing fully extended positions of the adjustable elements of the carrier. Fig. 3 is a detail perspective view showing part of the rear axle housing with parts of my auxiliary carrier mounted thereon. Fig. 4 is a longitudinal section on an enlarged scale of the duplex spring connection between parts of connecting-rods of the device. Fig. 5 is a rear elevation of part of the carrier, showing the removable extra carrying-wheel mounted thereunder. Fig. 6 is an enlarged detail view, partly in cross section and with parts broken away, of the separable connection between said extra wheel and said carrier. Fig. 7 is a side elevation of the rear portion only of a motor-vehicle equipped with a modified form of my bracketed carrier.

Similar numerals of reference denote corresponding parts throughout the several views.

The numeral 12 denotes the frame of a motor-vehicle carrying the usual motor equipment with power transmission means to the differential-gearing in the differential-casing 53 and the rear-axle housing parts 49. The forward axle 10 is as usual relatively fixed in relation to said rear axle, that is has no rocking movements. The axles and rear axle-housings are in connection with the supporting wheels 50 at the rear.

Referring first to said Fig. 3, the numerals 1 and 2 denote like clamping-members fitted on opposite parts of the axle-housing parts 49 and having forward and rearward contacting flanges secured together by bolts 4 to be held tightly thereupon. As shown, these clamps may be connected at the rear by integral hinge parts 26 orificed in line with the orificed forward ends of bracket-arms 14 mounted therein, and taking pivot-bolts 13 secured removably by split-pins.

The upper part 2 of each of said clamping-means has an integral standard 3, orificed at the upper end to receive the terminal rings of forwardly- and rearwardly-projecting connecting rods 5 and 16 respectively.

The numerals 5 and 7 denote the two rod parts of a connecting-rod, which is connected between each standard 3 and clamps 9 secured removably by bolts 11 on the front axle 10. The rod parts 5 and 7 are connected adjustably together by means of a turn-buckle 6, and the front ends of the parts 7 have rings 8 connected to rear orificed flanges on the clamps 9.

The bracket-arms 14 project rearwardly beyond the body of the vehicle and frame 12. These arms may be castings having terminal flat horizontal transverse plates 24 thereon, also integral orificed standards 15 thereon, the plates also having bolt-holes 25 to receive bolts 30 passed through any of bolt-holes 28 adjustably on a cross-bar 27 supported on the plates. Longitudinal angle-bars 31 have their forward ends secured to said cross-bar at either end by bolts 29. The rear ends of the angle-bars 31 are connected by means of a cross-bar 34.

On the rear ends of the angle-bars 31 are fixed standards 44, while on their forward ends are fixed standards 42, and the upper ends of the standards 42 and 44 are connected by connecting-rods 43. Angle-bars 32 are mounted to slide longitudinally within the inner angles of the angle-bars 31. The angle-bars 32 are connected at front and rear by means of cross-bars 33 and 35 respectively. It is to be understood, however, that all the cross-bars 27, 34, 33 and 35 are at one end connected to the abutting cross-bars pertaining to them by separable bolt and nut connections as at 29 and 36, and that these cross-bars are in superposed pairs to permit relative sliding upon each other transversely of the carrier to permit lateral widening thereof as indicated by the dotted lines in said Fig. 1. The adjustment thus afforded permits the carrier to be widened to an extreme width approximately that of the outer width of the carrying-wheels 50 transversely.

It will also be seen that the carrier may also be adjustably lengthened from front to rear, as indicated by the dotted lines in said Fig. 2. This is done by sliding the angle-bars 32 along the angle-bars 31. As shown in Fig. 1, when the rear section of the carrier is thus extended, a brace-rod 45 may be releasably connected between the standard 44 and a projection 46 on the two sections respectively to hold up the rear end of the rear section.

In case a very bulky or heavy load 47 has to be supported upon said carrier, an auxiliary carrying or trailer-wheel 41 may be removably mounted on and under said carrier. The wheel is rotatable between the forks of a standard or shank 40, and the latter has a clamping-member 38 which with a counterpart member are secured around the superposed cross-bars 34 and 33 by means of bolts 39. As this removable wheel is small, it may be readily stowed away in the vehicle when not in use.

The numerals 16 and 20 denote rod parts, of which the part 16 is connected at its forward end to the standard 3, while the part 20 is connected to the standard 15 to hold up and support the rear ends of said bracket-arms 14, which is quite necessary because these arms must be long to project beyond the overhanging body of the vehicle. To absorb shocks due to vertical oscillation of the loaded carrier when traveling over rough roads, the following resilient duplex shock absorber is connected between the approximated ends of the rod parts 16 and 20. The numeral 17 denotes a hollow casing closed at one end and open at the other, but a cap-closure 18 is threaded upon the open end of said casing as shown in said Fig. 4, and is centrally channeled at 19 to loosely pass the rod part 20, and a plunger-head 22 is threaded on the inner end of said rod part to move back and forth within said casing. The end of the rod part 16 is threaded into a socket in the closed end of the casing. A relatively light coiled compression-spring 23 is in said casing engaged between the closed end thereof and said plunger-head, and a relatively heavier coiled compression-spring 21 is also in the casing and engaged between the cap-closure 19 and the plunger-head. It will be seen that the relatively powerful downward shocks derived from the oscillation of the load on said carrier downwardly will be absorbed by the heavier spring 21, while the less powerful rebound will be absorbed by the lighter spring 23. Any residual shocks which may be transmitted unabsorbed to the clamps 1 and 2, are resisted by the anchor-rods 5—7, linked relatively rigidly to the front axle 10 so that there is no torque upon the axle-housing 49. It is desirable that no powerful torsion be exerted upon the axle-housing, which would tend to be communicated by way of the differential-casing and power-shaft to the motor to probably damage or unseat the latter. Instead of anchoring the rods 5—7 to the front axle they may be connected to any other relatively fixed part of the vehicle, such as the frame, to obtain the above result.

Referring to said Fig. 7, showing a modification of my device, the numeral 56 denotes a like pair of bracket-bars whose forward ends are rockingly mounted on the axle-housing 49 by means of U-bolts 51 and nuts 54, a wear-sleeve 52 being mounted between said U-bolt and axle-housing. As the bracket-bars may rock on the axle-housing, I have provided a fixed standard 55 on the bar 56 at each side of the car, and this standard is anchored against excessive rocking by the rod-connections 5'—7' as in Fig. 1, but instead of a turn-buckle connection between these parts a similar spring-barrel 17'—18' is connected therebetween, a single compression-spring 21' only being housed in the barrel as a shock-absorber for downward oscillations.

In this modification, there is also no load carried by the frame 12, all the load as in the other form, being carried by the rear axle-housing, so that there is no unpleasant jarring of passengers, nor extra loading on the vehicle springs at the rear.

The relatively long bracket-bars 56 carry a platform 58 secured removably thereto by bolts 57. A box or other load 47 may be carried on said platform, by having rope-connections 48 between hooks 60 on the box and ears 59 on the bracket-bars.

Having described my invention, what I claim as new, and desire to secure by Letters Patent, is:

1. The combination with a vehicle having both front and rear axles, of load-carrying bodies mounted on the rear axle projecting to the rear thereof, and connecting-means between said bodies and said front axle to anchor the projections of said bodies against downward movement.

2. The combination with a vehicle having both front and rear axles, of bodies mounted on the rear axle projecting to the rear thereof to carry a load on their projections, and elastic connecting-means between said bodies and said front axle to yieldingly restrict downward swinging movements of said projections while under load.

3. The combination with a vehicle having both front and rear axles, of bracket-bodies mounted pivotally on the rear axle having parts projecting to the rear thereof to carry a load, and elastic connecting-means between said bodies and said front axle to yieldingly restrict downward swinging of said projecting parts.

4. The combination with a vehicle having both front and rear axles, of bracket-bodies mounted on the rear axle with parts projecting therefrom, and longitudinally adjustable anchoring connecting-means between said bodies and said front axle adapted to adjustably restrict up and down movements of the projecting parts of said bodies.

5. The combination with a vehicle having both front and rear axles, of bracket-bodies mounted on the rear axle having standards fixed thereon, and connecting-rods between the ends of said standards and said front axle.

6. The combination with a vehicle having both front and rear axles, of bracket-bodies mounted on the rear axle having standards thereon, and adjustable connecting-rods connected between the free extremities of the standards and said front axle.

7. The combination with a vehicle having both front and rear axles, of bodies connected to opposite parts of the rear axle, and having load-carrying parts projecting therefrom, and connecting-devices between said bodies and a relatively fixed element of the vehicle including linking-means between them and the free ends of the projecting parts.

8. The combination with a vehicle having a rear axle connected to a driving mechanism, of clamping-bodies mounted upon said rear axle and load-carrying elements mounted thereon, and connections between said clamping-bodies and a relatively fixed part of the vehicle in advance of said axle to anchor the clamping-bodies preventing torsion of said axle and strain upon said driving mechanism.

9. The combination with a vehicle having a rear driving axle, of clamping-bodies on said axle, a load-carrier bracketed on said clamping-bodies to project to the rear of the axle, and connecting-devices between said clamping-bodies and a relatively fixed part of the vehicle in advance of the axle to anchor the clamping-bodies to prevent torsion upon the rear axle due to oscillation of a load on said carrier.

Signed at Waterloo, Iowa, this 5th day of December, 1922.

GEORGE COLVIN KENNEDY.